US 9,089,108 B2

(12) United States Patent
Anderson et al.

(10) Patent No.: US 9,089,108 B2
(45) Date of Patent: Jul. 28, 2015

(54) ADHESION SYSTEM FOR RAWHIDE AND MEAT CHEW FOR DOGS

(75) Inventors: David A. Anderson, Long Beach, CA (US); Richard L. Harpe, Huntington Beach, CA (US)

(73) Assignee: Redbarn Pet Products, Inc., Long Beach, CA (US)

( * ) Notice: Subject to any disclaimer, the term of this patent is extended or adjusted under 35 U.S.C. 154(b) by 2097 days.

(21) Appl. No.: 12/215,082

(22) Filed: Jun. 25, 2008

(65) Prior Publication Data
US 2009/0004338 A1 Jan. 1, 2009

Related U.S. Application Data

(60) Provisional application No. 60/937,693, filed on Jun. 29, 2007.

(51) Int. Cl.
*A23B 4/00* (2006.01)
*A01K 11/00* (2006.01)

(52) U.S. Cl.
CPC .................................. *A01K 15/026* (2013.01)

(58) Field of Classification Search
USPC .................................................... 426/92, 641
See application file for complete search history.

(56) References Cited

U.S. PATENT DOCUMENTS

| 2,988,045 | A | 6/1961 | Fisher | |
|---|---|---|---|---|
| 4,600,588 | A * | 7/1986 | Ernster | 426/42 |
| 5,635,237 | A | 6/1997 | Greenberg | |
| 5,673,653 | A | 10/1997 | Sherill | |
| 5,897,893 | A | 4/1999 | Mohilef | |
| 6,277,420 | B1 * | 8/2001 | Andersen et al. | 426/92 |
| 6,425,348 | B1 | 7/2002 | Twain | |
| 6,586,027 | B2 * | 7/2003 | Axelrod et al. | 426/132 |
| 6,840,196 | B2 | 1/2005 | Kirch | |
| 6,886,496 | B1 | 5/2005 | Brown | |
| 6,895,900 | B2 | 5/2005 | Hingst | |
| 2002/0185085 | A1 * | 12/2002 | Sherrill et al. | 119/710 |
| 2004/0258830 | A1 * | 12/2004 | Shu | 426/641 |

* cited by examiner

*Primary Examiner* — Nikki H. Dees
*Assistant Examiner* — Katherine D LeBlanc
(74) *Attorney, Agent, or Firm* — Paul M. Denk

(57) ABSTRACT

A palatable and long lasting chew for dogs combines a rawhide fraction with meat, poultry or fish. The rawhide fraction is from rawhide splits die cut into desired shapes. The rawhide fraction is then dehydrated to approximately 6% moisture. The meat, poultry or fish fraction then attaches to the rawhide component. The meat fraction is held to the rawhide fraction utilizing a food grade adhesive from milk protein hydrolysate. The milk protein hydrolysate is solubilized in hot water to a solids level between 3% and 30%. The solution is then applied to the rawhide component where the meat fraction will contact the rawhide. The meat fraction is then deposited onto the coated rawhide surface and the chew is then dehydrated to laminate the meat fraction to the rawhide fraction. Alternatively, the food grade adhesive is blended with the meat fraction and deposited in the rawhide.

14 Claims, 1 Drawing Sheet

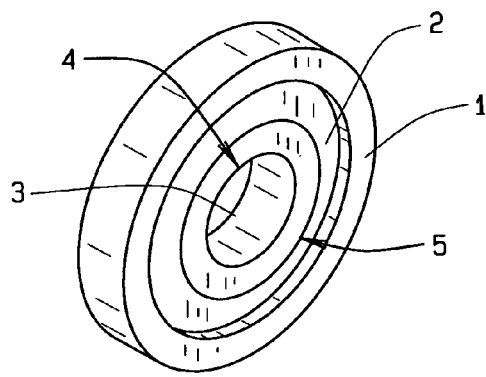
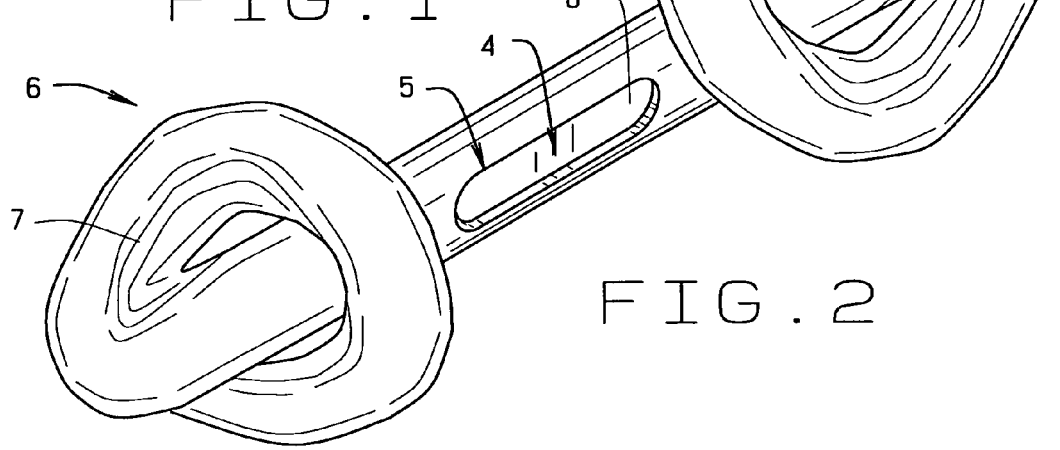
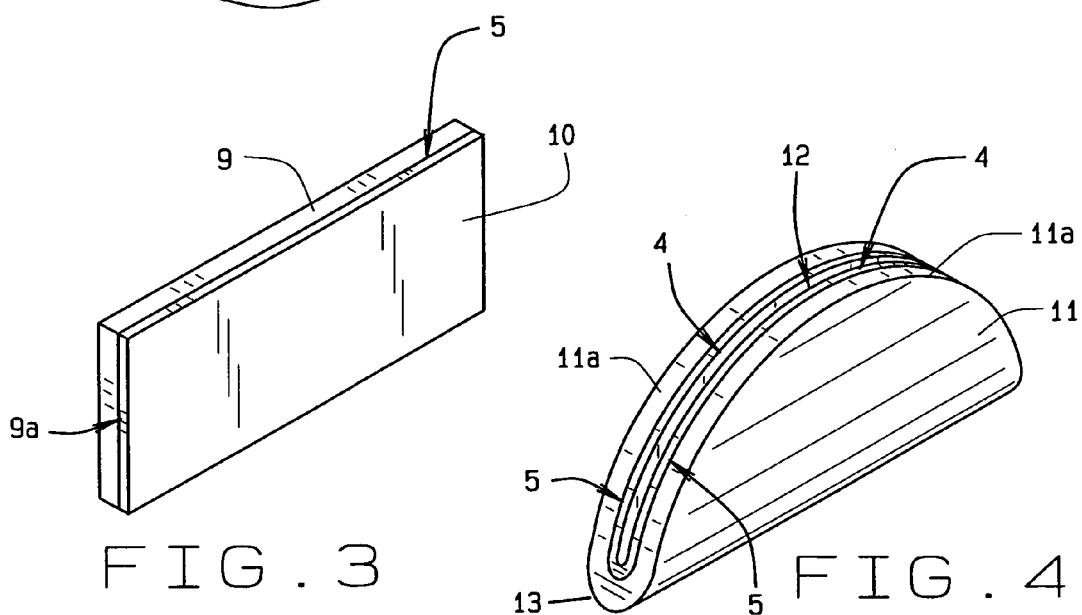

ADHESION SYSTEM FOR RAWHIDE AND MEAT CHEW FOR DOGS

CROSS REFERENCE TO RELATED APPLICATION

This non provisional patent application claims priority to the provisional patent application having Ser. No. 60/937,693 having filing date of Jun. 29, 2007.

BACKGROUND OF THE INVENTION

This invention identifies the product and process for attaching a meat, poultry or seafood fraction to a rawhide fraction resulting in a highly palatable and long-lasting chew for dogs.

There are a wide range of products positioned in the marketplace that serve as treats for dogs. One major segment typically called "chews" are formulated and processed in such a way as to be very long lasting. Examples of products with extended "chew-time" are products such as dehydrated body parts. Specific examples are cattle bones, hooves, knuckles, ears, and skin material. They are usually marketed in dehydrated form and typically offer very long chew times as compared to such items as biscuits, jerky or semi-moist style extruded treats. Perhaps the widest range of chew products are items made from rawhide.

Rawhide is the refined skin of cows, pigs, water buffalo and other such livestock. Because of the very tough nature of the processed rawhide fraction, it typically can be utilized to produce chews with an extended chew time.

One of the major difficulties with rawhide based treats has been the fact that the base rawhide by itself is not particularly palatable to dogs. To compound this problem, the processing aids that refine and bleach rawhide are also somewhat unpalatable and serve to further reduce the acceptability of this kind of chew to many dogs.

Manufacturers have attempted to solve this problem by incorporating secondary ingredients into the rawhide fraction to increase the acceptability of the chew. The methods utilized vary widely from simple marinating of a flavoring component into the rawhide fraction to more complex dual extrusion, injection, depositing, and enrobing techniques. A review of the prior art demonstrates numerous novel approaches to increasing the acceptability of the rawhide fractions.

The patent to Fisher, U.S. Pat. No. 2,988,045, describes the basic rawhide tanning techniques and how the layers of rawhide known in the trade as "splits" can be tied into unique shapes and dried to produce a long-lasting chew for pets. Twain, U.S. Pat. No. 6,425,348, taught a method of incorporating a chemical flavoring appealing to pets into a chewable rawhide fraction. Kirch, U.S. Pat. No. 6,840,196, taught a method of impregnating a flavoring compound into one sheet of rawhide and then wrapping a second sheet of rawhide around the flavored portion in such a way as to add a flavoring system without the potentially negative effects of having a rug staining issue from the flavoring incorporated onto the surface of the product. Hague, U.S. Pat. No. 6,895,900, taught a method of infusing a chlorophyll flavoring into a hide fraction and then forming perforations to allow the flavoring to contact the dog's teeth during chewing.

While methods as described above slightly increase the acceptability of the rawhide, there is a limit to the total weight quantity of flavoring that can be applied with these methods. Also, most marinating techniques work well only with soluble flavoring fractions.

Several inventors attempted to produce more acceptable products by incorporating dried or semi-moist meat fractions within layers of the rawhide treats. Sherill, U.S. Pat. No. 5,673,653, taught a method of taking thin slices of meat and putting this slice onto sheets of rawhide. The rawhide is then rolled into a roll or rope in such a way that the meat fraction is entrapped within the layers of rawhide. A portion of the meat slice is allowed to stick out of the sides of the roll and at the end horizontal seam in such a manner that a portion of the dehydrated meat fraction is rapidly available to the dog. While novel in approach, this method restricts the amount of meat fraction that can be applied to the inside of the treat. It also suffers from a lack of initial acceptability because very little dehydrated meat fraction is available on the surface of the treat for the initial presentation to the animal. Greenburg, U.S. Pat. No. 5,635,237, taught a method of melting rawhide in a twin-screw extruder and then reforming the product into various rope or unique designs based on the shape of the die. Utilizing Greenburg's process, a meat fraction could be substituted for the moisture used as a processing aid during the extrusion step. Again however, the meat fraction is not concentrated on the surface for maximum palatability but is dispersed at only a moderate level within the body of the treat. Also, the amount of fresh meat which can be processed is limited to the approximately 20% moisture level that can be handled during extrusion. Brown, U.S. Pat. No. 6,886,496, solved the problem of low meat levels in a treat by producing a pre-extruded dried meat log and then placing it on the inside of a rolled rawhide cylinder. While this method does provide a mechanism for including high meat fractions, very little of the meat would be available on the surface for the important aspect of initial attraction by the animal. Mohilef, U.S. Pat. No. 5,897,893, attempted to solve the problem of high initial attraction by incorporating the meat fraction on the surface of the treat. This was done by utilizing a complete tubular meat byproduct such as bovine esophagus and stuffing it over the outside of a long lasting fraction such as cattle bones. While this method does produce a novel appearing product, the esophagus fraction is not particularly palatable and the process is encumbered by a high processing cost imposed by the manual labor involved in the stuffing step.

From a review of the above teachings, it is clear that what is needed is a method of producing a combination rawhide-meat treat for dogs that exposes a significant portion of the meat fraction to the surface of the product but yet maintains the long chew time that can be achieved with the use of a properly prepared rawhide fraction. The current invention provides this method.

SUMMARY OF THE INVENTION

The objective of the present invention is accomplished by utilizing a food-grade adhesive to attach the emulsified or restructured meat, poultry or fish fraction to the tough and long lasting rawhide fraction. The food grade adhesive which has been discovered to create an irreversible bond between the meaty fraction and the rawhide fraction is derived from the protein fraction of cow's milk. The starting material for the adhesive is made by rennet or acid precipitation of the milk protein from the liquid milk. To make the strongest possible adhesive fraction, the casein is modified enzymatically or chemically to produce a milk protein hydrolysate product that will achieve a tough non-brittle bond between the meaty fraction and the rawhide fraction.

In the present invention, three separate fractions are utilized to produce a long lasting and highly palatable pet treat. The first fraction is a rawhide fraction utilized to provide the treat with an extended chew time. The most highly desirable treats can be formed utilizing a lightly bleached rawhide fraction so that the end product will be very white in color and will therefore not stain the rug of the dog owner. The rawhide fraction can be utilized in many different shapes such as flat chips, round disks, rolled ropes, knotted bone shapes or die cut with commercial tannery equipment known as a "clicker" into any two dimensional pattern. The thickness of the rawhide can range from rather thin in the case of rolled ropes of rawhide to considerably thicker, such as 4 to 6 mm in thickness, for slices, chips or die-cut hides.

The second fraction utilized in this invention is the meat, poultry or fish component. The finished product will have better palatability particularly during extended storage and distribution if low fat fractions such as liver, lung, or mechanically deboned meats are utilized in this application. The meat can be deposited onto the rawhide fraction directly in an emulsified slurry form or can be reformed by cooking into slices, sheets, chunks or patties prior to attachment to the rawhide material.

The third fraction necessary for the production of pet chews utilizing this invention is the food grade adhesive used to bond the meat fraction to the rawhide fraction. This is produced from milk protein which has been isolated from cow's milk by either rennet or acid precipitation of milk. The casein is then further treated by hydrolysis to assist in the solubilization and production of a milk protein fraction which serves as a glue to attach the meaty fraction to the rawhide component. There are several different methods that can be utilized for the proper preparation of the casein fraction. One such alternative is covered in U.S. Pat. No. 4,600,588 dealing with the manufacture of a milk protein hydrolysate through the use of enzymes to partially hydrolyze the milk protein. A second alternative product can be produced as outlined in U.S. Pat. No. 4,363,820 dealing with a hydrolyzed casein fraction that is solubilized and hydrolyzed with NaOH or sodium tripolyphosphate.

The hydrolyzed milk protein fraction is solubilized in water at a solids concentration between approximately 3% and approximately 30%. The milk protein hydrolysate syrup is then applied to the rawhide fraction where it is desirous to have a meat, poultry or fish fraction attached. Such application of the liquid milk protein hydrolysate can be done by spraying, dipping, brushing or any alternative method that applies the protein solution onto the surface of the rawhide. Within the general range, the hydrolyzed milk protein has a preferred concentration within approximately 5% to approximately 15%.

The meat slurry, patty, slice or nugget is then applied to the milk protein moistened rawhide. The treat or chew is then dehydrated in a dryer/oven to reduce the moisture content of the treat to the point where it will be shelf-stable. This will generally be in the range of approximately 6% to 10% moisture. The dehydration step will remove the moisture which had been applied with the milk protein hydrolysate fraction and will leave behind a bonded matrix where the meat, poultry or fish fraction is firmly attached to the base rawhide chew. The bond is so strong that the dog needs to actually delaminate the rawhide fraction in order to remove all of the meat, poultry or fish fraction from the rawhide portion. This is a significant improvement over any competitive product where a meaty slurry is just layered onto a rawhide fraction and then dried. In this case, the meaty portion of the treat can easily be detached by the dog and in fact will often flake off from the rawhide fraction during the shipping and distribution of the treat. This is particularly true if the meaty fraction includes any portion that is relatively high in fat content such as mechanically deboned beef, chicken or lamb fraction.

Alternatively, the meat fraction can be proportioned, sized and cooked into a specific shape prior to being attached to the rawhide fraction. One application produces a dehydrated beef jerky type of product by extruding a meat slurry onto a conveyor belt and then passing the belt through an oven to heat-set and to evaporate moisture from the matrix. When the jerky is dry enough to be shelf-stable, it can be sliced into desired shapes such as round chips, rectangular strips or bone shaped slices. These meaty portions can then be attached to a slightly larger rawhide fraction utilizing the casein based adhesive system described in this invention.

Another alternative approach, within the teachings of this invention, involves the addition of the milk protein hydrolysate to the emulsified meat slurry so that a single step process attaches the meaty portion onto the rawhide fraction. In utilizing this approach, we have found that it is advantageous to presolubilize the milk protein hydrolysate in a quantity of water and then pass this solution to the meaty slurry prior to addition onto the rawhide component. We have found that this solution should be between approximately 5% solids and 30% solids and should be added to the meat fraction at approximately 5% to 20% of the meaty slurry weight. The addition of the milk protein hydrolysate to the meaty slurry results in another advantageous characteristic: the milk protein fraction binds the meaty fraction and eliminates cracking, shrinking, peeling and overall loss of texture of the meaty fraction itself. This feature also assists in providing a longer chew time and improved efficacy of the treat.

A further improvement in product efficacy can be achieved by proper design of the rawhide shape that will help the adhesion system to keep the meaty fraction attached to the rawhide component even during aggressive chewing. We have found that producing solid pressed rawhide with a cavity suitable for depositing the milk protein syrup and meaty fraction provides for significantly longer chew times than simple flat rawhide shapes. Some of these shapes are shown in the attached drawings of a hollow knotted bone shaped chew treat, or a die-cut rawhide stick.

An alternative approach to achieving an extended chew time based on rawhide shape is demonstrated in FIG. 4 where a round die cut rawhide disk is folded over into a taco shape once the meaty slurry is attached to the rawhide component with the milk protein hydrolysate syrup.

The object of the present invention is to create a long lasting and highly palatable chew for dogs by combining a tough long lasting rawhide fraction with a highly palatable dehydrated meat, poultry or fish fraction.

It is a further objective of this invention to create a chew with the highly palatable meat, poultry or fish fraction exposed on the surface of the chew so as to provide for the maximum amount of attraction and overall palatability to the companion animal.

It is a further objective of this invention to provide a mechanism for attaching the meat, poultry or fish fraction to the rawhide fraction in a manner that requires extensive and aggressive chewing on the part of the animal to remove the highly palatable meat, poultry or fish fraction from the outside circumference of the rawhide.

BRIEF DESCRIPTION OF THE DRAWINGS

In referring to the drawings,

FIG. 1 provides an isometric view of a dog treat composed of a rawhide ring with recessed cavity containing attached meat;

FIG. 2 provides an isometric view of a dog treat composed of a knotted rawhide with attached chicken filling;

FIG. 3 provides an isometric view of a dog treat composed of a rawhide stick with attached beef jerky; and FIG. 4 provides an isometric view of a dog treat composed of a rawhide disc with chicken filling attached and folded over to simulate a taco.

The same reference numerals refer to the same parts throughout the various figures.

DESCRIPTION OF THE PREFERRED EMBODIMENT

In the present invention the first step is to prepare the individual components that are utilized to manufacture the end product of this process. The rawhide fraction must be custom processed into the desired shape, thickness and overall size in preparation for the attachment of the meat, poultry or fish fraction. A bleached rawhide split of approximately 2 mm to 5 mm in thickness is the preferred starting rawhide material. It can then be die cut or knife cut into a desired shape for a dog treat. Bone shapes, tied knots, disks, flat sheets and rolled or folded fractions represent some of the alternatives available to the formulator. For purposes of this invention, it is preferred that the rawhide be formed and dried prior to the attachment of the meat fraction. It is also preferred that the rawhide be formed in such a manner that a cavity, recession or raised edge be present to keep the liquid binder and meaty slurry in place on the rawhide until the completion of the drying cycle. The examples below give more detailed alternatives for specific shapes that function well with this invention.

A food grade adhesive is prepared to provide for a firm attachment of the meat, poultry or fish fraction to the rawhide. The milk protein hydrolysate is generally supplied in a dry powdered form. It must however be pre-solubilized in order to provide a functional attachment mechanism to firmly attach the meaty fraction to the rawhide. The preferred method of solubilizing the milk protein hydrolysate is to blend it into warm water at a solids concentration of between 5% and 15% and then heat the aqueous system to above about 160° F. to totally solubilize the milk protein fraction.

Alternatively, the milk protein hydrolysate can be solubilized with a high sheer mechanical mixer or blender directly into the meat, poultry or fish slurry. This should be done at a concentration of between 3% and 25% to be certain that the dried mixture will firmly attach to the rawhide surface. In general, when meat fractions with a high percentage of fat are used, it will take a higher percentage of milk protein hydrolysate to accomplish a firm attachment. When low fat meat fractions are used such as beef liver, a reduced percentage of milk protein hydrolysate will be required to firmly attach the meaty fraction.

The third component ingredient involves the meat, poultry or fish fraction to be attached to the rawhide component. This may be almost any fraction from the above sources but from a practical standpoint, some specific fractions are most preferable. When utilizing beef sources, we have found that the lower fat cuts such as liver, lobe only lung, and mechanically deboned beef are preferred over higher fat fractions. When a poultry based product is desired, the preference is toward a low fat material such as breast meat rather than whole ground chicken or viscera fraction. When utilizing a fish based raw material, again a low fat source should be considered, such as tuna, shrimp or whitefish, over a higher fat material such as sardine.

The meat fraction should be emulsified to a paste or slurry texture. Various flavoring, coloring or preservative agents can be incorporated into the emulsified meaty slurry. Such raw materials as salt, sugar, caramel coloring, titanium dioxide, potassium sorbate and natural or chemical antioxidants can also be incorporated.

In processing a finished product from the above components, the portion of rawhide to be in contact with the meat fraction is coated with a syrup of the milk protein hydrolysate. This can be done by spraying, rolling, dipping, brushing or depositing the necessary amount of protein hydrolysate solution onto the rawhide. The desired amount of meat, poultry or fish slurry is then deposited onto the moistened rawhide.

The treat is then dehydrated in conveyor or tray dryers until a shelf-stable moisture level of below 10% moisture is reached. The length of time required for dehydration is somewhat dependent on the temperature and airflow characteristics of the dryer utilized. From a public health standpoint, at least a portion of the dehydration should be done at a temperature exceeding 180° F. to be certain organisms, such as salmonella, are not present in the finished product.

Alternatively, the milk protein hydrolysate protein can be added directly to the meat, poultry or fish fraction and then this mixture is applied to the rawhide portion at the locations and in the thickness desired. The product is then subjected to the dehydration step as outlined above to produce the finished treat.

A further alternative is to form and then dehydrate meat, poultry or fish fraction into a desired shape such as a bone, strip, disk or log. The preformed jerky style component can then be attached to the rawhide component with use of milk protein hydrolysate adhesive.

EXAMPLE 1

Rawhide Ring with Recessed Cavity Containing Chicken Meat

As shown in FIG. 1, a rawhide and chicken meat treat for dogs was manufactured by producing rawhide rings 1 with a circular cavity 2 inside the circumference of the ring. A layer of liquid milk protein hydrolysate was utilized to attach a chicken slurry inside the above described cavity.

A rawhide ring was produced from bleached shoulder hide fraction. A thick shoulder hide approximately 6 mm in thickness was die cut with a clicker to produce the outline shown in FIG. 1. The pieces were heated to approximately 110° F. to produce a formable product. The rawhide was then pressed on a reciprocating punch press to cut-out the center cavity and to form the rawhide into the shape shown in FIG. 1. The rawhide was then dried at 140° F. for 4 hours followed by a further dehydration at 190° F. for 6 hours.

The outside diameter of the ring was 2.75". The hole or aperture 3 in the center of the ring was 1" in diameter. The cavity inside the outer ring was ⅜" wide and ⅜" deep. The overall height of the ring was ½". Once dried, the rings had an average weight of 35 grams.

A chicken slurry was prepared from chicken breast meat, as at 4, by emulsifying the chicken in a Stephen emulsifier. Salt was added to the mixture at a level of 2.0% and mixed tocopherol antioxidant was added at a level of 0.1%.

An adhesive 5 for attaching the poultry fraction to the rawhide was prepared by solubilizing 8% milk protein hydrolysate from Luxembourg Cheese Factories of Orangeville, Ill., into warm water. The water was then heated to 180° F. to totally solubilize the milk protein fraction. A bakery brush was used to apply a thick coating of milk protein syrup, as at 5, to the inside cavity of the rawhide fractions. It took approximately 5 grams of milk protein solution to properly coat the rawhide cavity.

The poultry fraction was then loaded into a pastry gun equipped with a 3/8" diameter nozzle and the cavity of the rawhide was filled with the poultry fraction. It took an average of 14 grams of the chicken slurry to fill the cavity. The filled rawhide rings were then dehydrated at 140° F. for four hours followed by a continued dehydration at 180° F. for an additional four hours.

The finished chicken-filled rawhide treats weighed an average of 44 grams each. Palatability testing on dogs indicated the product had exceptional palatability and that it was not possible for the dog to easily chew or to lick the poultry fraction from the cavity. Manual attempts to remove the chicken from the rawhide showed that it was necessary to delaminate the rawhide layer before the chicken fraction could be removed from the treat.

EXAMPLE 2

Knotted Rawhide with Chicken Filling

An alternative pet treat that can be made with the teachings of this invention shown in FIG. 2. This treat is a knotted rawhide shaped like a bone 6 with a cavity formed into the center of the bone shaped treat in which a milk protein hydrolysate adhesive, as previously described, is used to attach a chicken slurry. Utilization of the milk hydrolysate adhesive provides for a firm attachment of the chicken fraction and results in a longer chew time for the treat.

A bleached rawhide sheet of approximately 4 mm thickness from the stomach section of a cattle hide was sliced into rectangular patterns approximately 20" by 7". The product was then rolled very loosely to create a hollow area in the center of the wraps. The two ends were then each tied into a knot 7 and the rawhide treats were dehydrated for 4 hours at 140° F. This was followed by an additional dehydration step of 8 hours at 180° F. The knotted rawhide treats had an average overall length of 6" and an average weight of 142 grams.

A slot 8 was then milled with a converted milling machine on the topside of the treat between the two knotted ends. The slot was on average 2.75" long×3/4" wide. Because of the loose rolling of this bone shaped embodiment, the milled slot ended up a minimum of 1" deep and a cavity extended the total distance within the bone shape from one knot to the next. The product removed during this milling step reduced the average weight of the rawhide bone shaped treats to 136 grams.

An emulsified chicken breast slurry was produced by grinding chicken breast meat in a Stephens chopper for four minutes. Salt was then mixed into the slurry at the level of 2% and a mixed tocopherol antioxidant was added at a level of 0.1%.

A hydrolysate slurry was prepared by solubilizing the milk protein hydrolysate, of the Luxembourg Cheese Factory, in warm water and then heating with agitation to 180° F. The solution was then added to the surge tank of a Leonard Engineering pressurized air sprayer. The spray nozzle was then placed against the cavity on the top of the rawhide and was activated to allow for between 8 and 12 grams of the milk protein hydrolysate solution, as at 5, to be applied to the interior of the rawhide cavity.

The chicken breast emulsion was then added to a bakery pastry gun and the hollow rawhide bone shaped treats were filled with the emulsion. It took an average of 52 grams of wet weight chicken slurry, as at 4, to fill the bone shaped treats, particularly the slot 8. The bone shaped treats were then dehydrated at 140° F. for 4 hours followed by an additional 8 hours of dehydration at 180° F.

The final chicken flavored rawhide dog treat showed an average net weight of 162 grams. The poultry fraction was firmly attached to the rawhide and over long-term storage showed no splitting, cracking or shrinkage away from the surface of the rawhide. The treat was found to be highly palatable and it was difficult to pry the poultry fraction from the surface of the rawhide without actually delaminating the rawhide.

EXAMPLE 3

Rawhide Stick with Attached Beef Jerky

In this particular embodiment of the invention, the meaty fraction is formed and dried prior to the attachment to the rawhide component as shown in FIG. 3. The rawhide fraction was produced by taking bleached 5 mm splits from the cattle shoulder fraction and die cutting 6"×2" strips, as at 9, utilizing a cutting machine known in the trade as a "clicker." The strips which weighed an average of 60 grams wet were then dehydrated at 120° F. for 4 hours followed by 4 hours at 140° F. They were then dehydrated for an additional 4 hours at 180° F. At this point, the rawhide fractions had an average weight of 30 grams. By utilizing a lower temperature at the initial stage of the dehydration, the pieces did not curl and remained straight and flat which eased the eventual attachment of the dried meaty fraction. The drying cycle reduced the average length of the strips to 5 inches.

A beef jerky-style strip was produced by mixing together the following ingredients:

| Ingredient | % by weight |
| --- | --- |
| Beef Liver | 40.0 |
| M.D. Beef | 40.0 |
| Salt | 2.5 |
| Caramel Color | 1.0 |
| Wheat Gluten | 8.2 |
| Potassium Sorbate | 0.2 |
| Natural Tocopherol | 0.1 |
| 62 DE Corn Syrup | 8.0 |

The meats were tempered to 32° F. and were emulsified for 5 minutes in a Stephen bowl chopper operating at 3,600 rpm. The mixture was put in a Hobart mixer and the salt and wheat gluten were added followed by slow speed mixing for 5 minutes. The remaining ingredients were then added and the agitation was continued for an additional 5 minutes. The product was then deposited into a Dick sausage stuffer equipped with a 6" wide die 7/32" in thickness. The emulsion was then extruded from the stuffer onto a Sandvik belt oven where the ribbon of meat was heat-set at a temperature of 185° F. with a retention time of 5 minutes.

At the exit from the belt oven, the product was loaded onto trays and dehydrated in a tray dryer at 150° F. for 4 hours. The sheets of ribbons were then sliced into 5"×2" strips utilizing a Height reciprocating guillotine chopper operating at a speed of 10 feet per minute. The jerky strips at this point had a moisture level of 14.5% and were somewhat flexible which eliminated shattering at the point of slicing.

A milk protein hydrolysate adhesive 5 was prepared by solubilizing a milk protein hydrolysate known as M.P.H. and produced by Luxembourg Cheese Factories, into water at 80° F. at a concentration of 9%. The solution was then heated with indirect heat and continuous stirring to 180° F. to completely solubilize the milk protein fraction. The solution was then coated by means of a felt roller onto the surface, as at 9a, of one side of the rawhide strips, the surface eventually adjacent to the meat fraction. A coverage level of 5% wet weight solution was applied to the strips of rawhide.

One strip of jerky, as at 10, was then applied to the surface of each moistened piece of rawhide. The strips were passed between two rotating rollers with a clearance of ⅜" to be certain that the full underside of the jerky strips came in contact with the moistened rawhide strips.

The product was dehydrated at 180° F. for 1 hour to completely heat-set the adhesive and to pasteurize the product. The final product showed a firm attachment of the jerky strips to the rawhide component. It was not possible to peel the meaty fraction from the rawhide without actually delaminating the rawhide sheet. Feeding studies on even large dogs showed that this was a highly palatable product with an extended chew time in excess of 30 minutes on most animals.

EXAMPLE 4

Rawhide Taco Disc with Chicken Filling

A section of bleached cattle stomach hide was split to a thickness of 5 mm utilizing a splitter machine to begin the process resulting in the product shown in FIG. 4. A series of round disks 11 were then punched from the wet hide utilizing a "clicker" equipped with a 5.5" diameter die. The discs were then dried in a hot air dryer beginning with a temperature setting of 130° F. for a period of 4 hours. The drying was then continued for 6 hours at 140° F. at which point the rawhide had a moisture content of approximately 16% and had a somewhat flexible texture.

Chicken breast meat 4 was emulsified in a Stephan 3,600 rpm emulsifier. Natural tocopherol antioxidant was added at the level of 0.1%. A hydrolyzed protein product called E-Pro-HY produced by Excelpro Inc., Los Angeles, Calif. was solubilized in 180° F. water at a concentration of 14% E-Pro-HY. The solution was then cooled to 80° F. and was added to the emulsified chicken blend at a level of 15%.

The chicken slurry was then deposited onto the rawhide disks at a usage level of 60 grams of chicken meat per disk. The chicken slurry was manually spread across the top portion of the rawhide disk so as to cover one entire surface of the rawhide. The rawhide was then folded in half, as at 11a, with the chicken filling on the inside of the rawhide disk in such a manner as to simulate the appearance of a taco, generally semi-circular from the side with a gap 12 between folded halves 11a lengthwise on a hinge 13 of hide. The rawhide tacos were held in the folded position utilizing small spring loaded clamps.

The rawhide tacos were then placed in a tray dryer at 180° F. and dehydrated for 6 hours. At this point the overall moisture level of the product was below 8.0% moisture. The tacos had an average weight of 57 grams/piece at the end of the drying step. Subsequent feeding studies on the product showed that the treat had an extended chew time and was highly palatable. When the rawhide/chicken tacos were opened into an unfolded position, it was nearly impossible to remove the chicken layer from the rawhide portion. The rawhide had to actually be delaminated in order to peel off the chicken fraction.

In an alternate embodiment, the milk protein hydrolysate 5 was coated upon the inside surface of the disk for receiving the meat fraction 4 before folding of the disk.

Variations or modifications to the subject matter of this invention may occur to those skilled in the art upon review of the invention as described herein. Such variations, if within the spirit of this development, are intended to be encompassed within the scope of any claims to invention herein. The depiction of the invention as described, and as shown in the drawings, are set forth for illustrative purposes only.

We claim:

1. A rawhide and meat chew for animals comprising:
   an animal rawhide cut to the configuration of a specified shape, including one of a knot, a disk, a sheet, a roll, and a folded disk;
   a food grade adhesive applied to select locations of said rawhide, said food grade adhesive comprising a liquefied milk protein hydrolysate solubilized in water at a solids concentration of approximately 3% to approximately 30% and capable of application as an adhesive to select portions of said rawhide;
   a meat fraction comprising at least one, poultry and fish emulsified into one of a paste or slurry texture and applied to said rawhide at the location where the food grade adhesive has been applied; and,
   wherein the filled rawhide is then dehydrated into a chew for animals.

2. The rawhide and meat chew for animals of claim 1 further comprising:
   said milk protein hydrolysate solubilizing by blending into warm water at solids concentration approximately 5% to approximately 15% and then heating to 160° F.

3. The rawhide and meat chew for animals of claim 1 further comprising:
   said milk protein hydrolysate combining with said meat fraction into a slurry wherein said meat fraction is approximately 3% to approximately 25% of said slurry by weight.

4. The rawhide and meat chew for animals of claim 1 wherein:
   said meat fraction consisting of jerky having beef liver approximately 40.0% by weight; medium density beef approximately 40.0% by weight; salt approximately 2.5% by weight; caramel color approximately 10.0% by weight; wheat gluten approximately 8.2% by weight; potassium sorbate approximately 0.2% by weight; natural tocopherol approximately 0.1% by weight; and, 62 DE corn syrup approximately 8.0% by weight.

5. The rawhide and meat chew for animals of claim 1 further comprising:
   said milk protein hydrolysate being applied to at least one surface of said rawhide contacting said meat fraction.

6. The rawhide and meat chew for animals of claim 1 further comprising:
   said chew having 10% or less moisture content.

7. The rawhide and meat chew for animals of claim 6 further comprising:
   said chew having approximately 6% to approximately 10% moisture content.

8. The rawhide and meat chew for animals of claim 1 further comprising:
   said rawhide being heated to approximately 110° F. and then being pressed into a desired shape;
   said rawhide in a desired shape drying at a temperature of at least 140° F. for at least four hours and then drying again at a temperature of at least 180° F. for at least four hours.

9. The rawhide and meat chew for animals of claim 1 further comprising:
   said rawhide being rolled into hollow wraps, said wraps being knotted, then said wraps including a milled slot therein; and, said rawhide being in knotted wraps drying at a temperature of at least 140° F. for at least four hours and then drying again at a temperature of at least 180° F. for at least four hours.

10. The rawhide and meat chew for animals of claim 1 further comprising:
said rawhide being heated to approximately 110° F. then said rawhide being cut into strips; and,
said rawhide in strips drying at a temperature of at least 120° F. for at least four hours wherein said rawhide in strips remains in straight flat form without curling, then drying at a temperature of at least 140° F. for at least four hours and then drying again at a temperature of at least 180° F. for at least four hours.

11. The rawhide and meat chew for animals of claim 10 whereby:
said meet fraction consist of a jerky style meat fraction, said jerky first drying for approximately five minutes at 185° F., then said jerky drying again in a tray dryer at a temperature of at least 150° F. for four hours;
said milk protein hydrolysate solubilizing in water at 80° F. to a solids concentration of approximately 9%, then being heated to a temperature of at least 180° F.;
at least one strip of said rawhide being coated upon at least one surface using said milk protein hydrolysate slurry at a rate of approximately 5% wet weight; and,
said rawhide, following coating, drying at a temperature of at least 180° F. for at least one hour.

12. The rawhide and meat chew for animals of claim 1 further comprising:
said rawhide being cut into disk form;
said rawhide as disks drying at a temperature of at least 130° F. for at least four hours and then drying again at a temperature of at least 140° F. for at least six hours wherein said rawhide achieves approximately 16% moisture content; said food grade adhesive consisting of hydrolyzed protein solubilizing in at least 180° F. water forming a solution with approximately 14% concentration of said hydrolyzed protein, said solution then cooling to approximately 80° F.;
said meat fraction including emulsified poultry, and a natural tocopherol at a concentration of approximately 0.1%, and said hydrolyzed protein solution being added to said emulsified poultry at approximately 15% by weight; and,
said meat fraction being placed upon said rawhide disks, said disks being folded generally in half and said folded disks drying at a temperature of at least 180° F. for at least six hours wherein said disks as taco shapes have less than 8% moisture content.

13. A rawhide and meat chew for animals comprising:
an animal rawhide cut to a specific shape, including one of a knot, a disk, a sheet, a roll, and a folded disk;
at least one of a meat, poultry and fish fraction emulsified into one of a paste or slurry texture and having a food grade adhesive added into said meat 5fraction, said food grade adhesive including a liquefied milk protein hydrolysate solubilized in water at a solids concentration of approximately 3% to approximately 30% and; and,
said rawhide having a cavity accepting said meat fraction, wherein said rawhide when filled is then dehydrated into a chew for animals.

14. The rawhide and meat chew for animals of claim 13 further comprising:
said rawhide drying at a temperature of at least 130° F. for at least four hours and then drying again at a temperature of at least 140° F. for at least six hours wherein said rawhide achieves approximately 16% moisture content;
said food grade adhesive consisting of hydrolyzed protein solubilizing in at least 180° F. water forming a solution of approximately 14% concentration of said hydrolyzed protein and then cooling said solution to approximately 80° F.;
said meat fraction including emulsified poultry, natural tocopherol at a concentration of approximately 0.1%, and said hydrolyzed protein solution being added to said emulsified poultry at approximately 15% by weight; and,
said meat fraction being placed upon said rawhide, said rawhide including said meat fraction again drying at a temperature of at least 180° F. for at least six hours wherein said chew has less than 8% moisture content.

* * * * *